WILLIAM D. JORDAN, Jr.
LEONARD KATZIN
INVENTORS

BY [signature]

AGENT

Sept. 14, 1965 W. D. JORDAN, JR., ETAL 3,206,648
COORDINATE ARRAY STRUCTURE
Filed July 21, 1961 4 Sheets-Sheet 2

WILLIAM D. JORDAN, Jr.
LEONARD KATZIN
INVENTORS

BY [signature]
AGENT

Sept. 14, 1965 W. D. JORDAN, JR., ETAL 3,206,648

COORDINATE ARRAY STRUCTURE

Filed July 21, 1961 4 Sheets-Sheet 3

WILLIAM D. JORDAN, Jr.
LEONARD KATZIN
INVENTORS

BY [signature]

AGENT

Z AXIS COMB

X AXIS COMB

WILLIAM D. JORDAN, Jr.
LEONARD KATZIN
INVENTORS

BY [signature]

AGENT

United States Patent Office 3,206,648

Patented Sept. 14, 1965

3,206,648

COORDINATE ARRAY STRUCTURE

William D. Jordan, Jr., and Leonard Katzin, both of Los Angeles, Calif., assignors, by mesne assignments, to The Bunker-Ramo Corporation, Stamford, Conn., a corporation of Delaware Filed July 21, 1961, Ser. No. 125,790

17 Claims. (Cl. 317—101)

The present invention relates generally to a coordinate array structure and relates more particularly to an improved coordinate array structure having tridimensional conductor functions presented in a bidimensional manner.

In electrical or electronic systems employing a number of devices which are subject to a plurality of different selectable interconnections, it has been common practice to employ switching devices such as manually operated switches, relays, electronic gates, transfluxor cores or the like to establish the desired electrical paths for such interconnections. Generally these electrical paths have heretofore been created between various controlling and controlled devices, through such switching devices, by means of individual wire conductors, multiple wire conductor cables, printed metallic conductors carried by a base or by other similar means. When it is desired to establish, for example, several thousands of such interconnecting paths, the time required for the assembly of an interconnecting array becomes extensive and the physical task of making the necessary connections and disposing wire conductors between the devices being interconnected becomes at least difficult and, in some cases, impossible to accomplish by the prior known means. Additionally, the space required for the physical disposition of the conductors is necessarily relatively large. In some installational situations, it is also desirable to maintain a fast response time between the controlling and controlled devices. The described prior wiring techniques have been limited in their use where such fast response time is desired, inasmuch as distributed capacitance and inductance between the controlling and controlled devices tend to increase as wire conductors become more numerous, extend for greater distances and become more closely grouped. While the distributed capacitance may be reduced by greater spacing between individual conductors, the added lengths of wire needed to establish such spacing also increases such inductance and practical limits are soon reached.

A portion of the problems relating to a build up in the distributed capacitance and inductance may be solved by interlacing the wire conductors to form a three dimenisonal array, thus reducing the space required to house the wiring. However, when such a solution is attempted, further problems are presented. In such an arrangement, it may be seen that only a small portion of the total number of the interlaced wires (those on the outer extremities of the array) will be accessible for installation of electrical switching devices. Where the numerous physical connections are to be made to a large number of such switching devices, an arrangement of this type becomes highly impractical. Furthermore, means must be provided physically to support both the interlaced wires and the switching devices, again increasing the necessary size of the total structure, the time required for assembly, the cost of components and manufacture of the array, the inductance factors, and still further reducing the accessibility of most of the interconnections.

Still further problems exist in prior arrays intended for purposes similar to that of the present invention. When constructing multidimensional arrays from wire interconnecting elements, it is necessary that many connections be made with the switching devices at junctions of the wire elements. These connections have taken the form of soldered joints, pressure connections, frictionally engaged members and the like. Due to the large number of such connections, the possibility of poor junctions is high, thus reducing the reliability of both the array and the functional interconnections to be made thereby. Additionally, due to requirements for service, repair or adjustment of elements of these prior types of arrays and electrical components or associated circuits attached thereto, at least partial accessibility to the components must be provided, thus necessitating a greatly varied number of different lengths of wire, different types and sizes of supporting elements and associated structures. Accordingly, heretofore, the cost of such arrays has been excessive.

Therefore, in accordance with the present invention, a switching matrix or coordinate array structure is provided having a tridimensional conductor function with integral terminals presented in a bidirectional manner. The present array is constructed from a minimum of different types and shapes of elements arranged in a manner enabling the realization of a compact structure, still permitting easy access to switching devices or other electrical components attached to the array. The present array structure further permits several thousands of possible interconnections to be realized without exceeding practical limits of distributed capacitance or inductance, thereby permitting maintenance of the desired fast response time between a plurality of interconnected controlling and controlled devices. Further, in accordance with the invention, a module is provided that is useful in constructing a switching matrix wherein a number of first electrical conductors may be selectively coupled to any one of a number of second conductors in response to electrical signals conditionally applied to individual members of a number of third electrical conductors.

It is, therefore, one important object of the present invention to provide an improved electrical coordinate array structure.

Another object of the invention is to provide an improved coordinate array structure having tridimensional conductor functions presented in a bidirectional manner.

A further important object of the invention is to provide a coordinate array structure wherein distributed capacitance and inductance are low, compared with that in prior known array arrangements having a comparable number of interconnections.

Still another object of the invention is to provide an improved coordinate array structure requiring a relatively small space to house the structure and wherein time and effort necessary for assembly and connection to associated components and/or electrical circuits are greatly reduced.

A still further object of the invention is to provide an improved coordinate array structure wherein ready access is permitted to several thousands of junctions between conductors, thus enabling service, adjustment and/or repair thereof.

Another important object of the invention is to provide an improved coordinate array structure wherein the different types, shapes and sizes of elements thereof are maintained at a minimum.

Other and further important objects of the invention will become apparent from the disclosures in the following detailed specification, appended claims and accompanying drawings, wherein:

Figure 1:
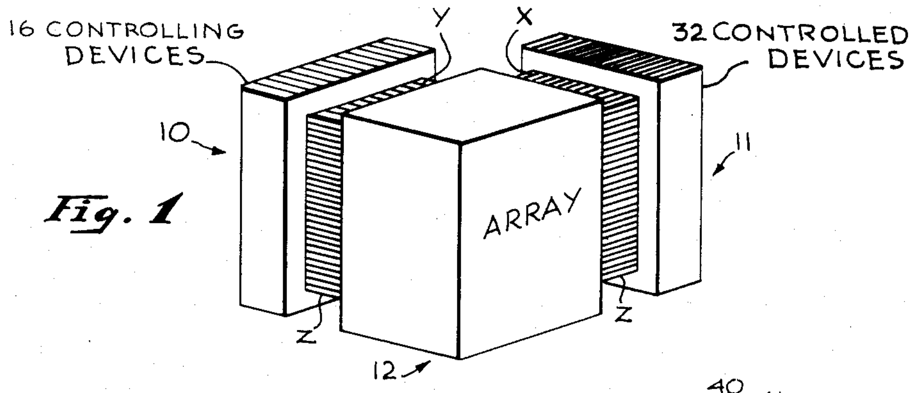
FIGURE 1 is a generally schematic perspective view illustrating a functional relationship between a plurality of controlling and a plurality of controlled devices, together with the present array interconnection arrangement.

With reference to the drawings and with reference primarily to FIG. 1, the present coordinate array structure will be described in connection with a typical example thereof as embodied in the interconnection of a plurality of controlling devices, having a number of input and output conductors, with a plurality of controlled devices. In actual practice, the controlling devices, indicated generally at 10 may be digital computer modules, for example, and the controlled devices 11 may be, for example, such apparatus as data storage recorders, memory devices, tape or card punch mechanisms, automatic typewriting machines or the like. In the present example, sixteen controlling devices are intended for selective connection with thirty two controlled devices, the interconnections therebetween being accomplished in a switching matrix or coordinate array structure indicated generally at 12. For further purposes of illustration, each of the sixteen controlling devices at 10 is defined as having a total of forty connections thereto (twenty input and twenty output conductors) with the conductors from each of the controlling devices at 10 as well as successive similar groups thereof being indicated as Y axis conductors or buses. Each of the thirty-two controlled devices at 11 is also provided with forty connections thereto with the conductors from each of the controlled devices being indicated as X axis conductors or buses. The described forty conductors from each of the controlling and controlled devices intersect along buses defined as Z axis conductors which are adapted to accept switching signals used to control switching between pairs of the respective groups of forty conductors. The number of Z axes conductors is, therefore, the product of the numbers of the X and Y axis conductors. A detail description of a system that may employ a switching exchange or coordinate array structure of the present type is contained in application, Serial Number 121,593, filed July 3, 1961, and directed to a "Modular Computer System," by Lowell D. Amdahl et al.

For the desired operation of the controlling and controlled devices and the interconnections therebetween, it is necessary that the coordinate array structure provide means to interconnect any one of the controlling devices with any one of the controlled devices. In this particular illustration, given by way of example only, it may thus be seen that a total of 20,480 junctions are required to accomplish the many (512 groups of 40) desired interconnections. When construction of this substantial number of junctions is attempted in a tridimensional array of the type schematically illustrated in FIG. 1, many of the beforementioned problems are present relating to accessibility of the junctions, substantially long lead lines, installation of switching mechanisms, high distributed inductance and capacitance and a high cost of the array.

The coordinate array structure constructed in accordance with the present invention serves to solve these and further problems as will be pointed out in detail hereinafter.

Figures 2B, 2C:
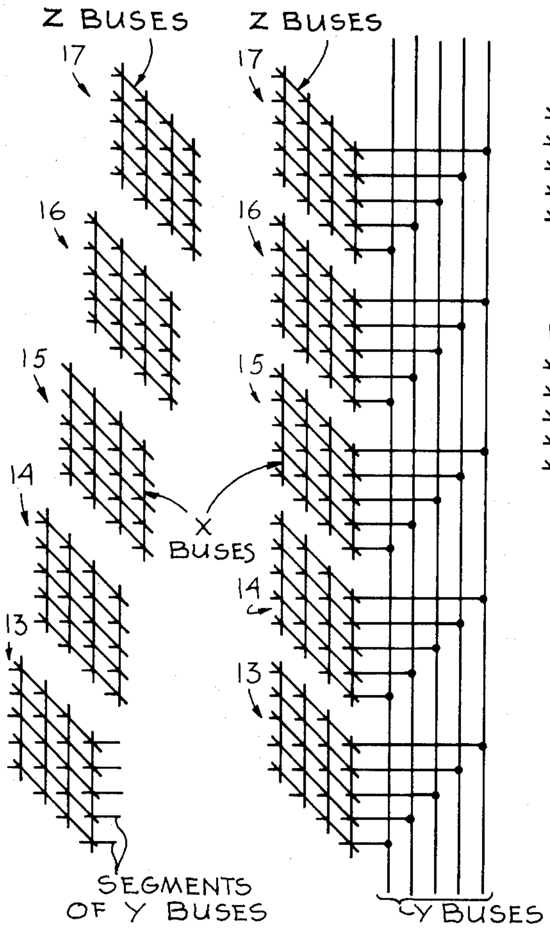
FIGS. 2A, 2B, 2C, 2D and 2E are a series of schematic illustrations representing evolutionary steps in the formation of the present coordinate array structure.
Figure 2D:
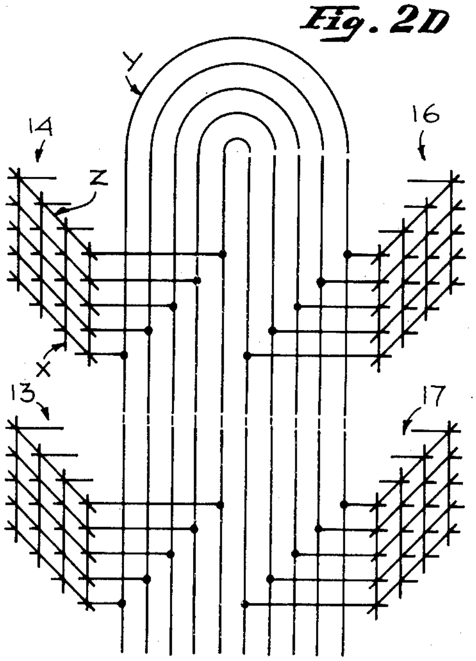
Figure 2E:
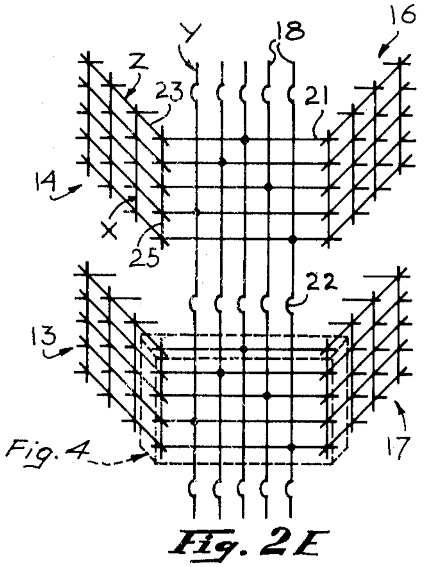
Figure 2A:
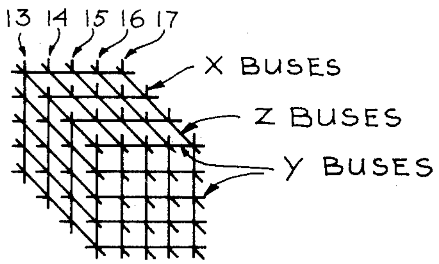

In order to define the present coordinate array structure, FIGS. 2A through 2E, inclusive, serve to describe and assist in an understanding of the manner in which the several thousand interconnections may be made while gaining the beforementioned advantages over other electrical interconnecting arrangements. With reference to FIG. 2A, a tridimensioned array is illustrated as having a plurality of X, Y and Z buses defining the three directional coordinates thereof. In establishing a bidimensional presentation of terminals in a tridimensional array, planes defined by the X and Z buses are separated from each other by cutting the Y buses between each of the planes, with these planes being separated and disposed in end to end coextensive relationship as illustrated in FIG. 2B. For purposes of illustration, the various planes defined by the X and Z buses are indicated at 13, 14, 15, 16 and 17 and after being moved into the relationship shown in FIG. 2B, the original electrical configuration is re-established, as illustrated in FIG. 2C, by connecting the stubs of the original Y buses to elongated extensions of the Y buses disposed parallel to the coextensively aligned X–Z planes. To reduce the height of the structure thus developed and illustrated in FIG. 2C, the newly established elongated Y buses are bent as illustrated in FIG. 2D and further to reduce redundancy established by duplicate folded Y buses, these buses are merged as illustrated in FIG. 2E into single Y buses having conductors extending laterally from each side thereof. It may thus be seen that the original tridimensional arrangement of the array as illustrated in FIG. 2A is now electrically identical with and the junctions thereof are presented in a bidirectional manner as illustrated in FIG. 2E. In this manner of presenting the junctions between the X, Y and Z conductors, all of the junctions are disposed on the exterior of the array in a manner to permit easy access thereto and connections of electrical switching apparatus.

Figure 5:
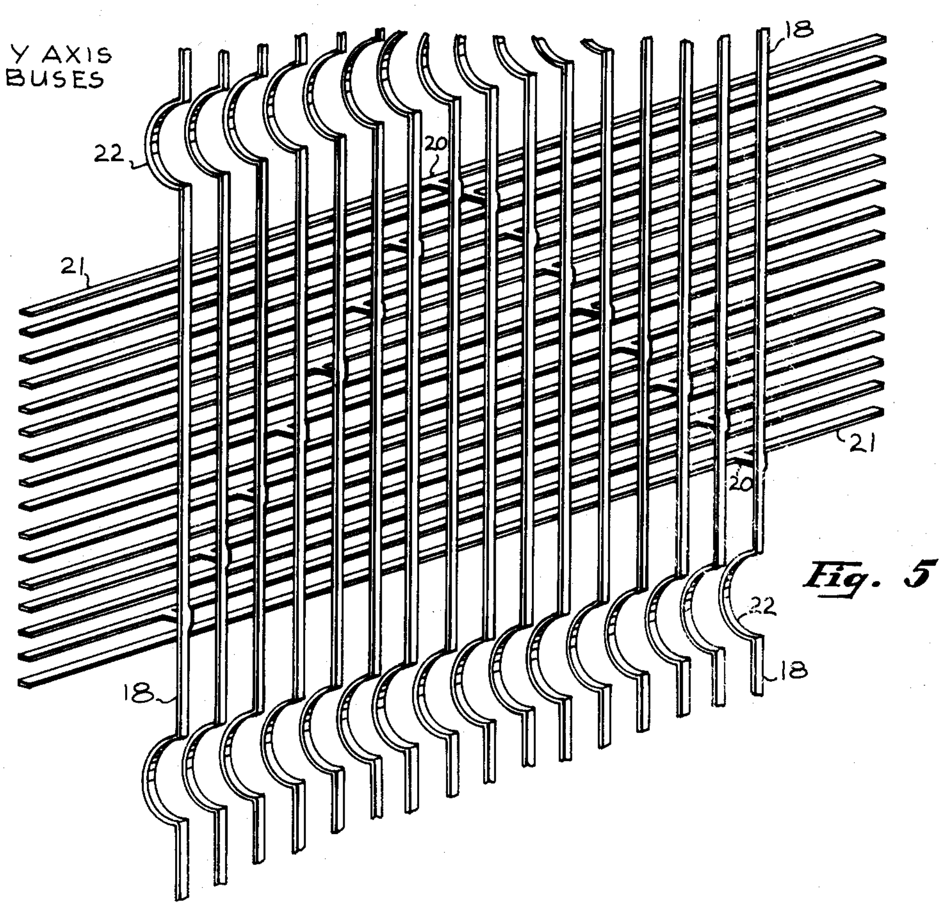
FIG. 5 is a fragmentary isometric view illustrating details of a portion of the electrical conductors of the present array structure and identified as Y axis buses.
Figure 6:
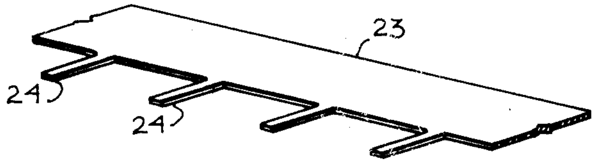
FIG. 6 is a fragmentary detail isometric view illustrating another of the electrical conducting elements identified as a Z axis comb.
Figure 7:
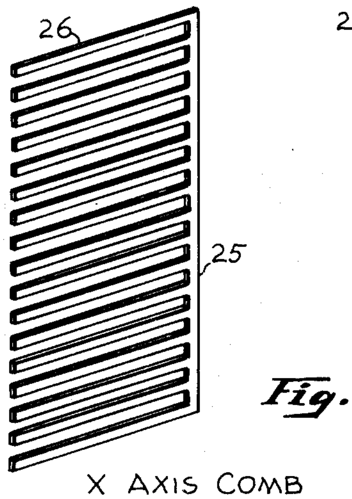
FIG. 7 is a detail isometric view showing a further electrical conducting element identified as an X axis comb.

In order to extend the principles outlined in FIGS. 2A through 2E and to implement the interconnection method illustrated in these figures, the various X, Y and Z conductors are individually constructed as by stamping from metallic sheets or ribbons of material such as brass and as represented in FIGS. 5, 6 and 7. As shown, the Y axis buses illustrated in FIG. 5 each comprise a vertically disposed portion 18 having integral laterally extending tabs 20 that are twisted substantially 90° and serve to support integral Y axis bilateral conductor portions 21, free ends of which form terminals. This particular construction arrangement permits formation of the Y axis buses including the portions 21 from integral stock material thus eliminating any necessity for joints or connections and increasing the reliability of the array. There is also a saving in material during manufacture, as the Y axis buses may be stamped from ribbon stock material. The Y axis buses are interwoven with each other as illustrated in FIG. 5, thereafter to be supported in this configuration in a manner to be described hereinafter. Each of the portions 18 of each of the Y axis buses is provided with an integral semicircular loop portion 22 to permit slight linear changes in length to compensate for dimensional differential permitted by manufacturing tolerances and for a purpose to be hereinafter more fully described.

The Z axis conductors are represented in FIG. 6 and comprise comb shaped elements each having an elongated base portion 23 with a plurality of terminal portions 24 extending laterally in spaced relationship from one edge of the base portion 23. The X axis conductors are also in the form of a comb shaped structure as illustrated in FIG. 7 and comprise a base portion 25 having a plurality of integral spaced terminal portions 26 disposed laterally from one edge of the base portion 25.

Figure 4:
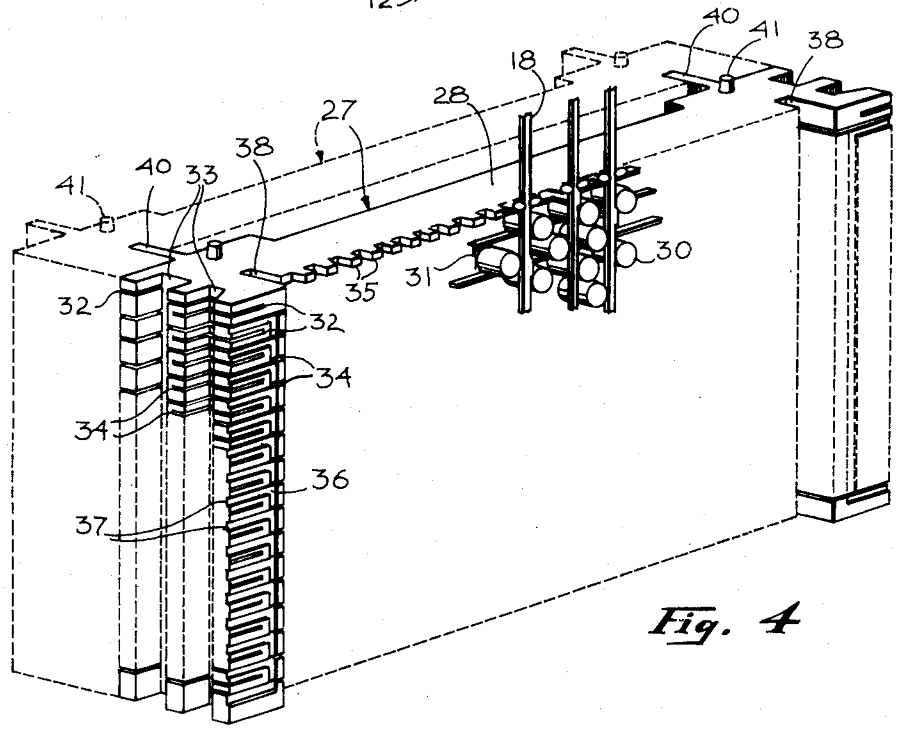
FIG. 4 is an enlarged isometric view illustrating details of an individual insulating spacer together with the means for supporting and orienting electrical conducting elements relative to the spacer.

The X, Y and Z conductor elements, as represented in FIGS. 5, 6 and 7, are supported in an electrically insulating support structure which comprises a plurality of individual adjacently disposed insulating spacers illustrated primarily in FIG. 4 and indicated generally at 27. Each of the spacers 27 is in the form of a generally rectangular solid molded body of a suitable insulating material and having width, height and length dimensions, the width dimension being substantially smaller than the height and depth dimensions with the width and length defining upper and lower surfaces. The width and height of each spacer define end surfaces and the height and depth define side surfaces. Each spacer further includes a central or web portion 28 having a plurality of integral cylindrical spacer members 30 disposed from a face 31 thereof. Enlarged integral mirror image end portions are formed on each end of the portion 28 of a spacer 27, there being a plurality of spaced horizontally extending slots 32 in the outer ends of the enlarged portions. For the purpose of reducing material and weight of the spacers, vertically extending grooves 33 are also formed in the outer exposed portions of the spacers 27. The base of the slots 32 are coextensive with the base of the grooves 33 and are adapted for intimate reception of the portions 23 of the Z axis combs, with the terminal portions 24 being adapted for disposition in a direction outwardly from ends of the spacer 27. The enlarged end portions of the spacers 27 are also provided with a plurality of slots 34 that are positioned intermediate the slots 32 and adapted for intimate reception of the portions 21 of the Y axis buses, terminal ends of these portions 21 extending beyond the outer ends of the spacer 27, the balance of the portions 21 being positioned along the face 31 of the central portion 28 of the spacer 27. The portions 18 of the Y axis buses are positioned between and maintained in spaced relationship by the cylindrical spacers 30 and are retained along upper and lower flanged edges of each of the spacers 27 by disposition between a plurality of tabs 35, these tabs 35 being formed over edges of the portions 18 as by deformation thereof by heat or other suitable means. As shown in FIGS. 4 and 5, the laterally extending integral portions 20 of each of the Y axis buses are staggered to prevent interference between adjacently disposed portions of the Y axis buses.

As shown primarily in FIG. 4, one lateral surface of each of the enlarged end portions of each of the spacers 27 is provided with a vertically disposed groove 36 from which a plurality of transverse horizontally disposed grooves 37 are disposed. The groove 36 is adapted for intimate reception of the base portion 25 of an X axis comb with the grooves 37 being adapted for reception of the terminal portions 26 of each X axis comb. The terminal portions 26 of the X axis combs (FIGS. 7 and 8) extend laterally outwardly from each of the ends of the spacers 27. The arrangement of the terminals 21, 24 and 26 is therefore such as to dispose these terminals at common exposed surfaces and from the ends of the insulating support as defined by the spacers 27.

With reference to FIG. 4, each of the spacers 27 is further provided with vertically extending grooves 38 adjacent ends thereof and intermediate the central portion 28 and the enlarged end portions of the spacer. Each of the spacers 27 is further provided with elongated tabs 40 that are disposed from one of the sides of the spacer opposite from and in transverse alignment with the grooves 38. The tabs 40 are adapted for disposition in the grooves 38 of adjacently disposed spacers 27, whereby to maintain a plurality of spacers in side by side oriented relationship, and also to maintain the Y axis bus portions 21 in the respective slots 34 in the spacer 27 by engagement of an edge of each tab 40 with the portions 21. Horizontally disposed edges of the spacers 27 are further provided with integral pins 41 that are adapted for reception in openings 42 (FIG. 8) in opposite surfaces of vertically adjacently disposed spacers whereby to align such vertically adjacently disposed spacers, the slots therein and other portions thereof.

Figure 3:
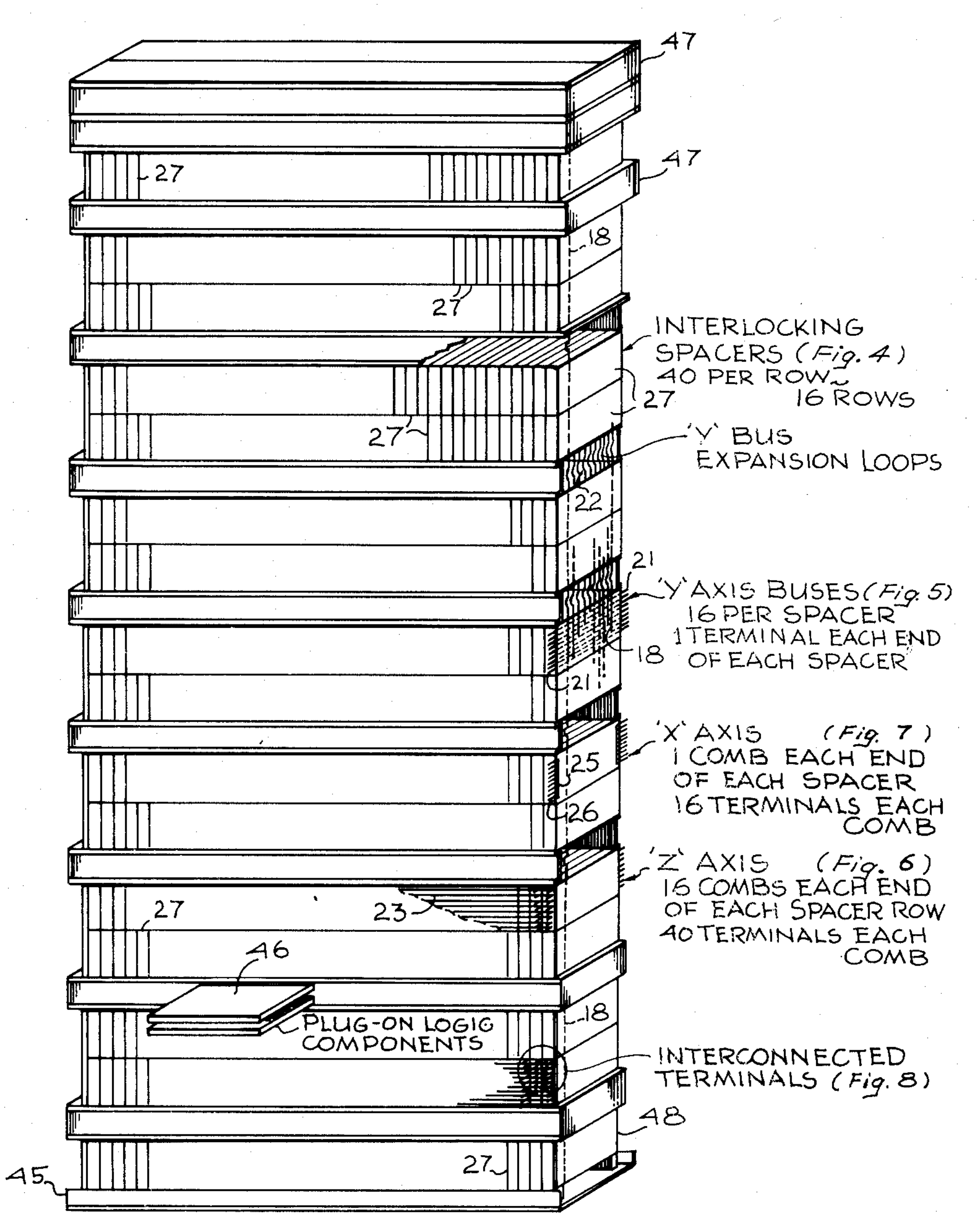
FIG. 3 is an oblique view of an example of a composite coordinate array structure constructed in accordance with the present invention.

It may thus be seen that the present coordinate array structure is constructed from only four different components, namely the Y axis buses, the Z and X axis combs and the insulating spacers. As illustrated in FIG. 3, duplicates of these four components are assembled in a manner to define the present coordinate array structure to fulfill the requirements of the example used in this description. A total of 1,280 X axis combs, 640 Y axis buses, 512 Z axis combs and 640 spacers are required to complete a structure necessary to satisfy the requirements of the example including the necessity for the 20,480 junctions. It is to be noted that each of the Z axis combs has a total of forty terminal portions 24 with the X axis combs each having a total of sixteen terminal portions 26. The Y axis buses each have sixteen lateral portions 21 which extend from each end of each of the spacers 27 to define a total of thirty-two terminals for each of the Y axis buses.

With reference to FIG. 3, a plurality of spacers together with the conducting elements forming the X, Y and Z axes are arranged further to carry out the present example. As shown, sixteen rows of forty spacers each are mounted in a frame structure 45. Terminals defined by the ends of the bilateral elements 21 of the Y axis buses, the portions 24 of the Z axis combs and the portions 26 of the X axis combs are presented to the forward and rearward exposed surfaces of the array, as viewed and illustrated in FIG. 3. Except for the lowermost and uppermost rows of spacers, groups of two rows of spacers are positioned vertically in contact with each other. The spaces between alternate rows of spacers accommodate the loop portions 22 of the Y axis buses and provide an area further to accommodate connecting leads between the present array and the controlled and controlling devices. Transverse elements of the frame 45 further serve to support supplemental circuits which may be in the form of printed circuit boards carrying the components of computer amplifier circuits. A typical example of such a board is shown at 46. The frame 45 further serves to support elongated box-like structures 47 through which suitable wiring may be run to provide the desired connections to the various conductors forming the present coordinate array structure. The rows of spacers are maintained in lateral and vertical alignment with each other by means of the grooves 38, tabs 40, the pins 41 and recesses 42. The rows of spacers are also retained in position within the frame 45 by means of a plurality of end plates 48 carried by and forming a portion of the frame structure 45. Electrical connections to the horizontally disposed Z axis combs may conveniently be made at a terminal thereof disposed at either end of each comb and connections to the X axis combs may conveniently be made to an endmost of the terminals 26 of each such comb. Connections to the Y axis buses are conveniently made at the uppermost ends of the portions 18 thereof.

Figure 8:
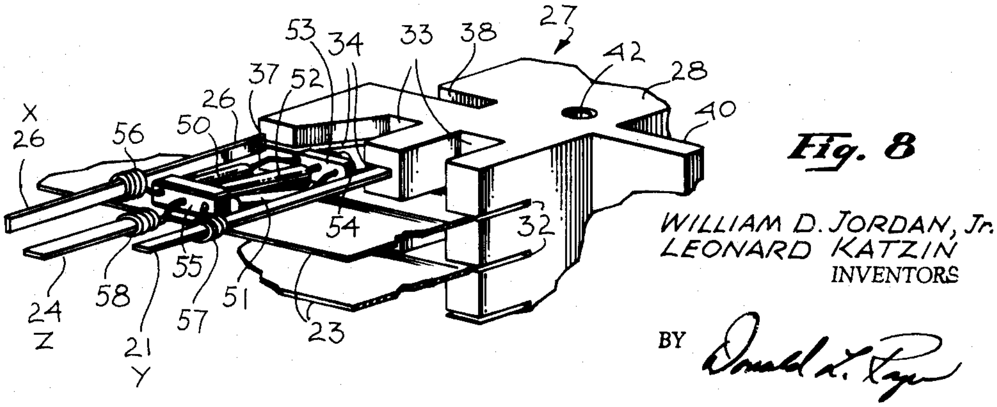
FIG. 8 is an enlarged, fragmentary, detail, isometric view taken from a position below the spacers as viewed in FIG. 4 and showing a typical electrical switching gate arrangement and the connection thereof to the X Y and Z axes electrical conductors.

As shown primarily in FIG. 8, in order to establish the desired switching between the X, Y and Z axes junctions, it may be seen that a diode gate may advantageously be employed although it is to be understood that other types of switching mechanisms such as relays or the like may be employed without departing from the spirit and scope of the present invention. With reference to FIG. 8, a typical diode gate may employ a pair of semiconductor type, axial leaded diodes 50 and 51 together with an axial leaded resistor 52. The axial leads from one of the ends of the resistor and diodes are supported by and fed through suitable openings in a block 53 thereafter to be secured together as at 54 to form a gate center. Axial leads at other ends of these components are fed through suitable openings in an insulating block 55 with a lead from the diode 50 being connected as at 56 to the X axis terminal portion 26. A lead from the diode 51 is connected as at 57 to terminal end 21 of a Y axis bus and a lead from the resistor 52 is connected as at 58 to the Z axis terminal portion 24. It is to be noted that the particular arrangement of the terminal portions 26, 21 and 24, in forming groups of three conductor terminals, is such as to receive and closely to confine elements of the diode gates thus maintaining the compact nature of the array and permitting desirable short lead lengths for the gate components.

It is to be noted that each of the terminal portions 26, 21 and 24 of the X, Y and Z axes conductors respectively are rectangular in cross section and present relatively sharp edges at each of the four corners thereof. Accordingly, a reliable electrical connection may be made to each of the terminal portions by wrapping the lead of the appropriate component several times tightly about the desired terminal portions as illustrated at 56, 57 and 58, the sharp corners of the terminals serving to produce a positive connection with the component leads. Thus, no solder connections are needed for attachment of the gates to the terminals and accordingly possibilities of heat damage to the diodes is reduced. The terminals also serve as the sole supporting means for the components of the gates thus eliminating any need for auxiliary supporting structure. It is also to be noted that the arrangement of the conductors defining the X, Y and Z axes is such as to require no interconnections therebetween other than through the switching gates, thus assisting in establishing and maintaining a high reliability expectancy. Furthermore, inasmuch as all of the metallic conductors in the present coordinate array structure are maintained in precise locations by means of the slots, grooves and separating elements of the spacers 27, conductor lead lengths may be kept as short as possible and thus both distributed capacitance and inductance are retained extremely low compared with that of prior known wiring techniques for structures having a similar function.

It is also clearly apparent that the few different types of components, as well as the identical nature of duplicated components and the orderly arrangement thereof, serve to permit relatively rapid assembly of the present coordinate array structure and the ability to permit attachment of switching arrangements thereto at readily accessible locations. As pointed out, such attachments may be made without the use of normally employed solder junctions to reduce the over-all time and effort required for assembly of the array over conventionally wired interconnecting and switching ararngements. From a practical standpoint it has been found that the present array may be assembled and completely wired in a time that is in the order of $1/10$ of the time required to make the connections by individually run wires. The relatively small size of the array which, in one actually constructed array, is in the order of seven feet high, four feet wide and eight inches deep, enables housing and disposition of the structure in restricted areas, reduces the over-all weight thereof and reduces problems of assembly and service. It is still further to be noted that the use of the many duplicated components serves greatly to reduce the cost of such a coordinate array structure.

We claim:

1. A coordinate array structure for use in providing selective tridimensional electrical interconnections between a plurality of controlling and a plurality of controlled devices, said array structure comprising: a frame structure; a plurality of identically shaped and interlocked insulating spacers disposed in groups thereof in said frame structure; electrically conductive members carried in spaced relationship by and interconnecting said groups of spacers, said conductive members defining X, Y and Z coordinate axes of said array and having integral generally rectangular in cross section terminal portions disposed outwardly from at least one common exposed surface of said groups of spacers; and electrical switching devices connected to at least a portion of tridimensional junctions defined by said terminal portions of said conductive members, at least a portion of said conductive members being adapted for connection to said controlling and controlled devices.

2. A coordinate array structure for use in providing selective tridimensional electrical interconnections between a plurality of controlling and a plurality of controlled devices, said array structure comprising, in combination: a frame structure; a plurality of insulating spacers disposed in groups thereof in said frame structure; electrically conductive members carried in spaced relationship by and interconnecting said groups of spacers, said conductive members having integral terminal portions disposed outwardly from and at common exposed surfaces of said groups of spacers, groups of said conductive members defining each of said axes being of a common configuration; and electrical switching devices positioned within confines of said terminal portions and connected to at least a portion of tridimensional junctions defined by said terminal portions of said conductive members, a portion of said conductive members being adapted for connection to said controlling and controlled devices.

3. A coordinate array structure for use in providing selective tridimensional electrical interconnections between a plurality of controlling and a plurality of controlled devices, said array structure comprising, in combination: a frame structure; a plurality of identically shaped and interlocked insulating spacers disposed in groups thereof in said frame structure; electrically conductive members carried in spaced relationship by and at least a portion thereof interconnecting said groups of spacers, said conductive members defining X, Y and Z coordinate axes of said array and having integral generally rectangular in cross section terminal portions disposed outwardly from and at common exposed surfaces of said groups of spacers; groups of said conductive members defining each of said axes being of a common configuration; and electrical switching devices positioned generally within the confines of said terminal portions and connected to at least a portion of tridimensional junctions defined by said terminal portions of said conductive members, a portion of said conductive members being adapted for connection to said controlling and controlled devices.

4. In a module useful in constructing a switching matrix for selectively coupling any one of a number of first electrical conductors to any one of a number of second electrical conductors conditionally in response to electrical switching signals conditionally applied to individual members of a number of third electrical conductors: a supporting structure having exposed surfaces; a first set of conductors carried by and extending from said supporting structure; and a second set of conductors carried by said supporting structure and extending from one of said exposed surfaces of said structure, said second set of conductors being arranged to define a plurality of groups thereof, a first conductor in each of said groups being individually and electrically connected to a corresponding individual one of said first set of conductors, a second conductor in each of said groups being individually and electrically connected to a corresponding second conductor in each other of said groups, a third conductor in each of said groups being adapted for connection to an independent switching signal to which said switching matrix is conditionally responsive.

5. In a module useful in constructing a switching matrix for selectively coupling any one of a number of first electrical conductors to any one of a number of second electrical conductors conditionally in response to electrical switching signals conditionally applied to individual members of a number of third electrical conductors corresponding to the product of the number of first and second conductors: a supporting structure having exposed surfaces; a first set of conductors carried by and extending from one of said exposed surfaces of said supporting structure; and a second set of conductors carried by said supporting structure and extending from another of said exposed surfaces of said structure, said one and another of said exposed surfaces each generally lying in mutually intersecting planes, said second set of conductors being arranged to define a plurality of groups of three conductors each, a first conductor in each of said groups being individually and electrically connected to a correspondingly different one of said first set of conductors, a second conductor in each of said groups being individually and electrically connected to a corresponding second conductor in each other of said groups, a third conductor in each of said groups being adapted for connection to an independent switching signal to which said switching matrix is conditionally responsive.

6. A module in accordance with claim 5 wherein said supporting structure comprises a plurality of individual supporting members, each generally defining a rectangular solid having width, height and depth dimensions, said width dimension being substantially smaller than said height and depth dimensions, the width and depth of said solid generally defining upper and lower module surfaces, the width and height of said solid generally defining first and second end module surfaces and the height and depth of said solid generally defining first and second side module surfaces and wherein said first set of conductors extend generally away from at least one of said upper and lower module surfaces and said second set of conductors extend generally away from at least one of said end module surfaces.

7. In a module useful in constructing a switching matrix for selectively coupling any one of an M number of first electrical conductors to any one of an N number of second electrical conductors in response to electrical switching signals conditionally applied to individual members of an M×N number of third electrical conductors: a supporting structure having exposed surfaces; a first set of conductors, M in number, carried by and extending from said supporting structure; and a second set of conductors carried by said supporting structure and extending from one of said exposed surfaces of said structure, said second set of conductors being arranged to define at least one set of conductor groups, M in number, each group comprising three conductors each, a first conductor in each of said groups being individually and electrically connected to a correspondingly different one of said first set of conductors, a second conductor in each of said groups being individually and electrically connected to a corresponding second conductor in each other of said groups, a third conductor in each of said groups being adapted for connection to an independent switching signal to which said switching matrix is to be responsive, whereby a plurality of said modules, equal in number to at least N/P may be positioned adjacent to one another with each of said first and second sets of M conductors extending from said modules being individually connected to a corresponding one of said M conductors extending from another module in forming said switching matrix.

8. In a switching matrix for selectively coupling any one of a number of first electrical conductors to any one of a number of second electrical conductors conditionally in response to electrical switching signals conditionally applied to individual members of a number of third electrical conductors: a supporting structure having exposed surfaces; a first set of conductors carried by and extending from said supporting structure; a second set of conductors carried by said supporting structure and extending from one of said exposed surfaces of said structure, said second set of conductors being arranged to define a plurality of groups of three conductors each, a first conductor in each of said groups being individually and electrically connected to a correspondingly different one of said first set of conductors, a second conductor in each of said groups being individually and electrically connected to a corresponding second conductor in each other of said groups, a third conductor in each of said groups being adapted for connection to an independent switching signal to which said switching matrix is conditionally responsive; and switch means individually connected to each of said groups of three conductors, said conductors in each of said groups being disposed in a spaced relationship to receive said switching means therebetween.

9. In a switching matrix for selectively coupling any one of an M number of first electrical conductors to any one of an N number of second electrical conductors in response to electrical switching signals conditionally applied to individual members of an M×N number of third electrical conductors, the combination of: a plurality of modules each defining a supporting structure and having exposed surfaces; a first set of conductors, M in number, carried by and extending from one of said exposed surfaces of said supporting structure; a second set of conductors carried by said supporting structure and extending from another of said exposed surfaces of said structure which is substantially normal to said one of said exposed surfaces, said second set of conductors being arranged to define at least one set of conductor groups, M in number, each group comprising three conductors each, a first conductor in each of said groups being individually and electrically connected to a correspondingly different one of said first set of conductors, a second conductor in each of said groups being individually and electrically connected to a corresponding second conductor in each other of said groups, a third conductor in each of said groups being adapted for connection to an independent switching signal to which said switching matrix is responsive; and switch means individually and electrically connected to each of said groups of three conductors, said conductors in each of said groups being disposed in a spaced relationship to receive said switching means therebetween, said modules being positioned adjacent to one another with each of said first and second sets of M conductors extending from each of said modules being individually and electrically connected to a correspondingly different one of said M conductors extending from another module in forming a switching matrix, having at least N sets of said conductor groups.

10. A switching matrix in accordance with claim 9 wherein each module is of substantially the same size and shape, each generally defining a rectangular solid having width, height and depth dimensions, said width dimension being substantially smaller than said height and depth dimensions, the width and depth of said solid generally defining upper and lower module surfaces, the width and height of said solid generally defining first and second end module surfaces and the height and depth of said solid generally defining first and second side module surfaces and wherein said first set of conductors extend generally away from at least one of said upper and lower module surfaces and said second set of conductors extend generally away from at least one of said end module surfaces.

11. An apparatus according to claim 10 wherein said first set of conductors extend generally away from and between both said upper and lower module surfaces and wherein a plurality, M in number, of the conductors in said second set of conductors extend between and away from both of said end surfaces.

12. An apparatus according to claim 11 wherein each of the first set of conductors carried by a plurality of said modules is substantial and integral metallic ribbon extending between modules and wherein each of said plurality, M in number, of the conductors in said second set of conductors is a physical integral portion of a different one of said first set of M conductors.

13. An apparatus according to claim 11 wherein said end surfaces of each module are slotted along said height dimension to retain comb shaped conductors each having teeth, M in number, each tooth thereof serving as said second one of said conductors in each of said groups of three conductors each.

14. An apparatus according to claim 11 wherein a plurality of said modules are positioned with said side surfaces thereof in contact with each other and said end surfaces are slotted in width to accept and retain comb shaped conductors each having teeth, each tooth forming a third conductor in each of said groups of three conductors on each module, said comb shaped conductor being positioned intimately in the slots to assist in maintaining said sides of said modules in said contact with each other.

15. A coordinate array structure for use in providing selective electrical interconnections between a plurality of first devices and a plurality of second devices, said array structure comprising:

a plurality of insulating spacers;

first, second, and third groups of electrically conductive members carried in spaced relationship by said spacers, said groups of conductive members respectively defining X, Y and Z coordinate axes of said array and having integral terminal portions disposed outwardly from at least one common exposed surface of said spacers; and electrical devices each connected to one of said terminal portions from each of said defined axes adjacent said common exposed surface, at least a portion of said conductive members being adapted for connection to said first and second devices.

16. In a module useful in constructing a switching matrix for selectively coupling any one of N first electrical conductors to any one of M second electrical conductors conditionally in response to electrical switching signals conditionally applied to individual members of M×N third electrical conductors:

a supporting structure having at least first and second substantially perpendicular surfaces;

means supporting said first electrical conductors parallel and adjacent to said first surface;

a plurality of busses each connected to a different one of said second electrical conductors, each of said busses positioned adjacent to said first surface and having N terminals extending parallel to and beyond said second surface;

each of said third electrical conductors positioned adjacent said supporting structure and having a terminal extending substantially perpendicularly from said second surface proximate to a different one of said bus terminals; and N terminals connected to each of said first electrical conductors extending substantially parallel to said first surface to beyond said second surface, each such terminal being positioned proximate to one of said bus terminals and one of said third electrical conductor terminals.

17. In a module useful in constructing a switching matrix for selectively coupling any one of N first electrical conductor sets each comprised of P conductors to any one of M second electrical conductor sets each also comprised of P conductors conditionally in response to electrical switching signals conditionally applied to individual members of M×N third electrical conductors:

P supporting structures each having at least first and second substantially perpendicular surfaces, said structures being arranged so that all of said first surfaces extend parallel to one another and all of said second surfaces are aligned with one another;

means supporting one of said conductors from each of said N first electrical conductor sets adjacent the first surface of each of said supporting structures;

a plurality of busses each connected to a different one of said second electrical conductors, each of said busses positioned adjacent to the first surface of one of said supporting structures and having N terminals extending parallel to and beyond the second surface thereof;

each of said third electrical conductors positioned adjacent said supporting structures extending parallel to said second surfaces and having P terminals each extending substantially perpendicularly from the second surface of a different one of said structures proximate to a different one of said bus terminals; and N terminals connected to each of said first electrical conductors extending substantially parallel to said first surfaces to beyond said second surfaces, each such terminal being positioned proximate to one of said bus terminals and one of said third electrical conductor terminals.

References Cited by the Examiner

UNITED STATES PATENTS

| | | | |
|---|---|---|---|
| Re. 20,436 | 7/37 | Frank | 339—22 |
| 2,872,624 | 2/59 | Belek et al. | 317—99 |
| 2,936,407 | 5/60 | Ewald | 317—101 |
| 3,010,052 | 11/61 | Heath et al. | 339—17 |

JOHN F. BURNS, *Primary Examiner.*

DARRELL L. CLAY, *Examiner.*